US008571533B2

(12) United States Patent
Jiang

(10) Patent No.: US 8,571,533 B2
(45) Date of Patent: Oct. 29, 2013

(54) LOCAL MOBILE NUMBER FOR A FOREIGN RESIDENT MOBILE

(75) Inventor: John Yue Jun Jiang, Danville, CA (US)

(73) Assignee: Roamware, Inc., Santa Clara, CA (US)

( * ) Notice: Subject to any disclaimer, the term of this patent is extended or adjusted under 35 U.S.C. 154(b) by 18 days.

(21) Appl. No.: 13/284,763

(22) Filed: Oct. 28, 2011

(65) Prior Publication Data

US 2012/0135722 A1    May 31, 2012

Related U.S. Application Data

(60) Provisional application No. 61/407,832, filed on Oct. 28, 2010.

(51) Int. Cl.
*H04W 88/02* (2009.01)

(52) U.S. Cl.
USPC ......................................................... 455/415

(58) Field of Classification Search
USPC ................... 455/415, 461, 432.3, 426.1, 410
See application file for complete search history.

(56) References Cited

U.S. PATENT DOCUMENTS

| | | | | |
|---|---|---|---|---|
| 7,369,848 B2 * | 5/2008 | Jiang | ......................... | 455/432.3 |
| 7,505,769 B2 * | 3/2009 | Jiang | ......................... | 455/432.3 |
| 7,577,431 B2 * | 8/2009 | Jiang | ......................... | 455/432.1 |
| 7,912,464 B2 * | 3/2011 | Jiang | ......................... | 455/432.1 |
| 8,155,622 B1 * | 4/2012 | Moshenberg et al. | ........ | 455/410 |
| 2011/0294472 A1 * | 12/2011 | Bramwell et al. | ............ | 455/413 |
| 2012/0020293 A1 * | 1/2012 | Nix et al. | ...................... | 370/328 |

OTHER PUBLICATIONS

GSM 902 on MAP Specification Digital Cellular Telecommunications (Phase 2+); Mobile Application Part (MAP) Specification (3GPP TS 09.02 version 7.9.0 Release 1998).
GSM 340 on SMS Digital cellular telecommunications system (Phase 2+); Technical realization of the Short Message Service (SMS); (GSM 03.40 version 7.4.0 Release 1998).
GSM 378 on CAMEL Digital Cellular telecommunications system (Phase 2+);Customized Applications for Mobile network Enhanced Logic (CAMEL) Phase 2; Stage 2 (GSM 03.78 version 7.2.0 Release 1998).
GSM 978 on CAMEL Application protocol Digital cellular telecommunications system (Phase 2+); Customized Applications for Mobile network Enhanced Logic (CAMEL); CAMEL Application Part (CAP) specification (GSM 09.78 version 7.1.0 Release 1998).
3 GPP TS 29.010 V3.10.0 (Dec. 2002); Technical Specification; $3^{rd}$ Generation Partnership Project; Technical Specification Group Core Network; Information element mapping between Mobile Station—Base Station System (MS-BSS) and Base Station System—Mobile-service Switching Centre (BSS-MSC); Signalling procedures and the Mobile Application Part (MAP) (Release 1999).
Q761 (Functional description of the ISDN User Part of CCITT Signaling System No. 7) (Dec. 1999).
Q762 (General Functions of CCITT Signaling System No. 7 ISDN User Part Messages and parameters). 1999.

(Continued)

*Primary Examiner* — Diane Mizrahi
(74) *Attorney, Agent, or Firm* — Arent Fox LLP

(57) ABSTRACT

A system and method for providing a local number service at a native country mobile operator to a foreign resident mobile of a foreign resident country mobile operator. The service enables the foreign resident mobile to receive calls and SMS messages irrespective of its location. It also allows the foreign mobile to register with the native country mobile operator and perform communication services with a local identity.

18 Claims, 12 Drawing Sheets

(56) References Cited

OTHER PUBLICATIONS

Q 763 (Formats and codes of CCITT Signaling System No. 7 ISDN User Part Message and parameters). 1999.

Q 764 (1999), Signaling System No. 7—ISDN User Part signaling procedures.

Q765 (Application Transport Mechanism, CCITT Signaling System No. 7 ISDN User Part ) (May 1998).

Q766 (Performance Objectives in the Integrated Services Digital Network Application, CCITT Signaling System No. 7 ISDN User Part) (Mar. 1993).

Q767 (ITU-T—Application of the ISDN User Part of CCITT Signaling System No. 7 for International ISDN Interconnections) (1991).

Q768 (ITU-T—Signalling Interface Between an International Switching Centre (ISC) and an ISDN Satellite Subnetwork) (Oct. 1995).

Q769 (ITU-T—ISDN User Part Enhancements for the Support of Number Portability) (Dec. 1999).

Q1214, ITU-T Intelligent Network Distributed Functional Plane for Intelligent Network CS-1. 1995.

Q1215, ITU-T Physical Plane for Intelligent Network CS-1. 1995.

Q1218 ITU-T Interface Recommendation for Intelligent Network CS-1. 1995.

Q 711 (1996), Functional description of signaling connection control part.

Q 712 (1996), Definition and function of signaling connection control part messages.

Q713 (1996), Signaling connection control part formats and codes.

Q 714 (1996), Signal connection control part procedures.

Q701, Specifications of Signalling System No. 7—Functional Description of the Message Transfer Part (MTP) of Signalling System No. 7. 1993.

Q702 ITU-T Specifications of Signalling System No. 7, Signalling Data Link. 1993.

Q703 ITU-T Specifications of Signalling System No. 7—Message Transfer Part. Signalling link. 1996.

Q704, Signalling network functions and messages. Specifications of Signalling System No. 7—Message Transfer Part. (Jul. 1996).

* cited by examiner

LOCAL MOBILE NUMBER FOR A FOREIGN RESIDENT MOBILE

RELATED APPLICATIONS

This application claims the benefit of U.S. Provisional Patent Application No. 61/407,832 entitled "Method and System for enhanced connectivity," filed on Oct. 28, 2010. This application is a continuation-in-part of U.S. patent application Ser. No. 11/700,964 entitled "Method and System for Keeping All Phone Numbers Active While Roaming with Diverse Operator Subscriber Identity Modules," filed on Feb. 1, 2007. This application is also related to U.S. Pat. No. 7,577,431, entitled "Providing Multiple MSISDN Numbers in a Mobile Device with a Single IMSI," filed on Feb. 18, 2004, and U.S. Pat. No. 7,505,769, entitled "Signaling Gateway with Multiple IMSI with Multiple MSISDN (MIMM) Service in a Single SIM for Multiple Roaming Partners", filed on Aug. 13, 2004. Each of the aforementioned patents and patent applications is incorporated herein by this reference in its entirety.

FIELD OF THE INVENTION

Aspects of the present invention generally relate to mobile communication. More specifically, the invention relates to offering a local mobile number to a foreign mobile device. Aspects of the present invention are targeted to foreign residents with relatives and friends in their native (interchangeably referred to herein as "birth") or frequently visited countries.

BACKGROUND OF THE INVENTION

Many immigrants keep regular contacts with relatives and friends in their native countries. They also often visit their native countries. However, international calls and roaming calls can be very expensive.

One current solution is to use a cheap international calling service (e.g. VoIP/Skype or calling card) by an immigrant to call relatives and friends at resident country while using a local SIM card when visiting native country. However, this does not make it cheaper for the relatives and friends to call the immigrant at resident country. Furthermore, changing to a local SIM card often requires two phones (one for the native country and one for the resident country) otherwise the immigrant would have to swap the local SIM with the SIM of resident country).

Another solution is for an immigrant to have a local number offered by a cheap international calling service (e.g. VoIP/Skype or calling card). The local number makes it cheaper for the relatives and friends to call the immigrant. However, the local number often does not support receiving text messages. Furthermore, when the immigrant visits the native country, it does not help reduce the roaming cost.

Yet another solution is to offer an immigrant with a foreign device a local roaming number when visiting the native country. It helps reduce the roaming rate for the immigrant and makes it cheaper for the relatives and friends to call the immigrant when the immigrant is visiting the native country. However, it does not help relatives and friends call the immigrant when the immigrant is not in the native country as the local roaming number is temporary in nature and is not in service when the roamer is no longer registered with the native country mobile operator (e.g. left country or back home). Such solutions are described, for example, in U.S. Pat. Nos. 7,505,769 (discussed above) and 7,912,464 entitled "Providing Multiple MSISDN Numbers in a Mobile Device with a Single IMSI," filed on Aug. 5, 2009, the entirety of which is incorporated by reference herein.

Yet another solution is to have an alliance between a native country mobile operator and a resident country mobile operator in such a way that the immigrant will have a native country mobile number with a resident country single IMSI mobile device or a foreign mobile number with native country single IMSI mobile device. The mobile device can have a single IMSI SIM where the IMSI can belong either to the native country mobile operator or to the resident country mobile. However, this solution depends on the alliance and requires complex special signaling and billing arrangement. Such a solution is described, for example, in U.S. Pat. No. 7,505,769 (discussed above).

Yet another solution is to have an alliance between a native country mobile operator and a resident country mobile operator in such a way that the immigrant will have a native country mobile number with a resident country dual/multi-IMSI mobile device or a foreign mobile number with native country dual/multi-IMSI mobile device. The mobile device has a dual (or more) IMSI SIM where one IMSI corresponds to a mobile operator in resident country and the other to the native country. However, this solution depends on the alliance and requires complex special signaling and billing arrangement. Such a solution is described, for example, in U.S. Pat. No. 7,369,848 entitled "Signaling Gateway with Multiple IMSI with Multiple MSISDN (MIMM) Service in a Single SIM for Multiple Roaming Partners," filed on May 23, 2006, the entirety of which is incorporated by reference herein.

Yet another solution (Jiang SIMM-V roaming patent) is to have an outbound roamer of a home operator taking any visiting country SIM by facilitating the automatic forwarding of text message and calls to the roamer's home mobile number to the new visiting country SIM. While this can be offered to a foreign resident mobile with a foreign resident country mobile operator SIM, the solution requires the change back to the home operator SIM when back home in order to enjoy local communication services. Such a solution is described, for example, in U.S. patent application Ser. No. 11/700,964 entitled "Method and System for Keeping All Phone Numbers Active While Roaming with Diverse Operator Subscriber Identity Modules," filed on Feb. 1, 2007, the entirety of which is incorporated by reference herein.

In accordance with the foregoing, there is a need in the art for a cost-effective solution for facilitating mobile communication between an immigrant and its relatives and friends in the native country and for making it convenient for the immigrant to visit the native country.

SUMMARY

The present invention is directed to provide a foreign operator independent method for proving a local mobile number (or MSISDN) by a native country mobile operator to a foreign immigrant resident with a foreign mobile device with a normal single IMSI SIM (Subscriber Identity Module) of a foreign mobile operator at the resident's country. The method includes associating at a Signaling Gateway, the local mobile number (MSISDN) and its associated local IMSI with the foreign SIM's mobile number (MSISDN) and its associated foreign IMSI. The method facilitates the forwarding of text messages (i.e. SMS or short message service) and calls to the local mobile number to the associated foreign mobile number. The method further enables the foreign device/SIM to register with the native country mobile operator as if a local device/SIM with the local mobile number and its associated local IMSI, when the foreign resident is visiting the native country with the foreign device/SIM. The method further optionally handles the interface to the prepaid system at the native country mobile operator where the local mobile number is set up as a prepaid account for the foreign resident.

The method can be offered by a native country mobile operator to any foreign resident of any foreign mobile operator. There is no special arrangement required between the native country mobile operator and the foreign resident's mobile operator. However, a local mobile number can only be associated with one foreign number and vice versa.

Although the service is described in terms of native country and foreign resident, it can be equally used by a Multinational corporation employee who needs to have a local presence at the frequently visited country that can receive call and SMS wherever and can benefit from a local rate when visited country.

There may be a KYC (Know Your Customer) procedure for the foreign immigrant to perform at the native country, e.g. presenting passport and/or relative address information. For a Multi-national corporation employee, this can be done with the local branch office.

Although usually offered as a prepaid account, the native country mobile operator can also offer the foreign immigrant a postpaid account if there is relative agreeing to pay for the number or credit/debit direct debit set up.

BRIEF DESCRIPTION OF DRAWINGS

In the drawings, the same or similar reference numbers identify similar elements or acts.

Whenever not specified, normal GSM and industry standard flows will be followed.

DETAILED DESCRIPTION

In the following description, for purposes of explanation, specific numbers, materials and configurations are set forth in order to provide a thorough understanding of the invention. It will be apparent, however, to one having ordinary skill in the art, that the invention may be practiced without these specific details. In some instances, well-known features may be omitted or simplified, so as not to obscure the present invention. Furthermore, reference in the specification to "one aspect" or "an aspect" means that a particular feature, structure or characteristic, described in connection with the aspect, is included in at least one aspect of the invention. The appearance of the phrase "in an aspect", in various places in the specification, does not necessarily refer to the same aspect.

The present invention provides a system and a method for facilitating local mobile number service for a foreign mobile device/SIM (referred to interchangeably herein as Local Mobile number for Foreign Mobile device or LMFM). The system facilitates LMFM service for a foreign resident whose mobile device/SIM is associated with a foreign mobile operator, with a corresponding foreign IMSI and foreign MSISDN, but may be roaming in the native country of the foreign resident with the foreign mobile registered at the native country mobile operator. The system further includes a prepaid account for the foreign resident mobile with the native country mobile operator with a virtual IMSI and a local MSISDN. The foreign country IMSI and MSISDN are hereinafter referred to as IMSI-Foreign (IMSI-F) and MSISDN-Foreign (MSISDN-F), respectively. Likewise, the native country IMSI and MSISDN are hereinafter referred to as IMSI-Local (IMSI-L) and MSISDN-Local (MSISDN-L).

Figure 1:
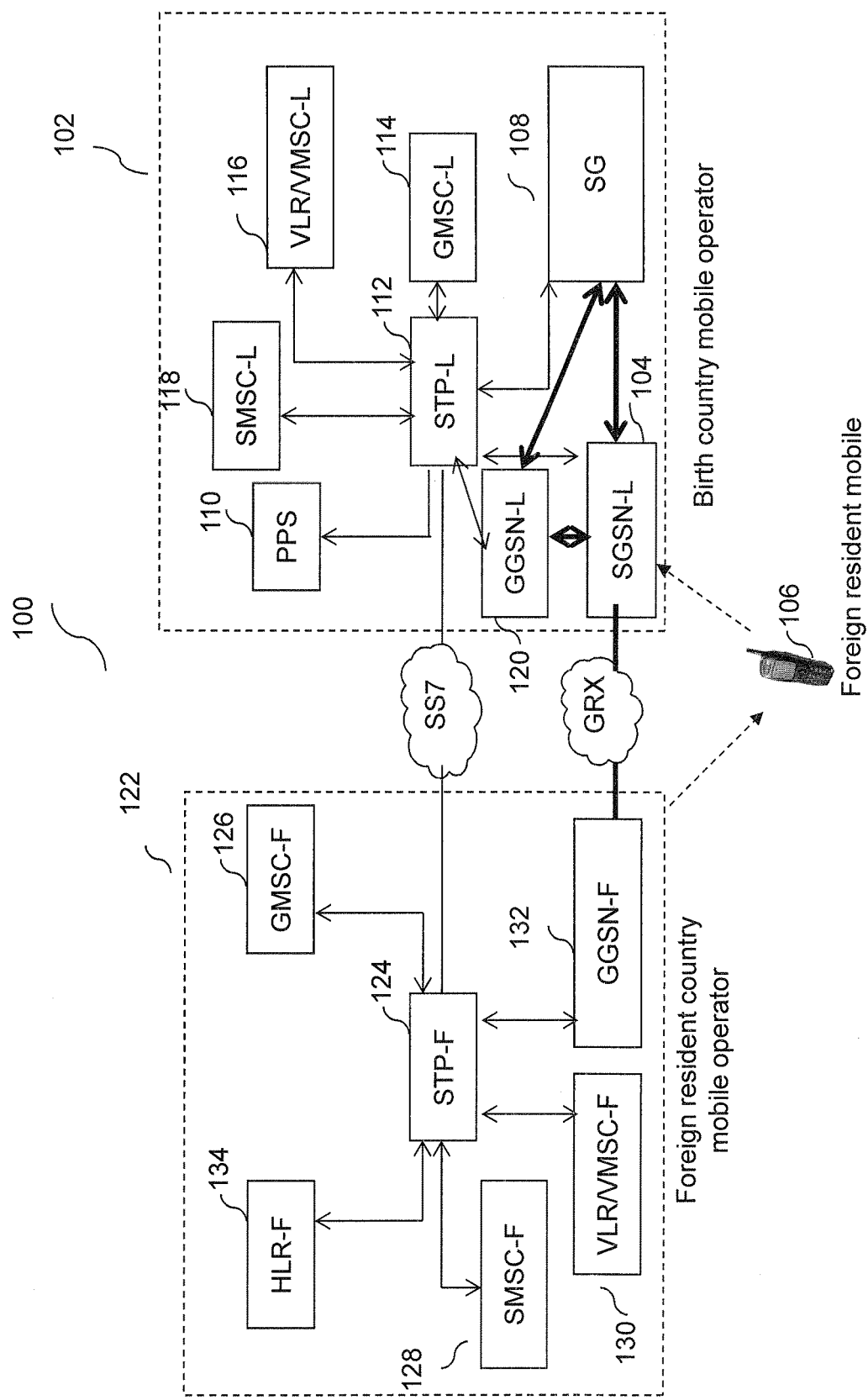
FIG. 1 represents a system for implementing the method, in accordance with an aspect of the invention.

FIG. 1 represents a system 100 for facilitating LMFM service. The system includes a native country mobile operator 102 that offers the LMFM service to a foreign resident mobile 106 of any foreign resident country mobile operator 122. The foreign resident mobile 106 can be registered in any country including at home with the foreign resident country mobile operator 122 and at roaming with the native country mobile operator 102. The native country mobile operator 102 consists of mobile network elements SMSC-L 118, SGSN-L 104, GGSN-L 120, GMSC-L 114, VLR/VMSC-L 116, PPS 110, SG 108 which are connected via a signal transfer point STP-L 112 using SS7. The SGSN-L 104, GGSN-L 120 and SG 108 are also connected via an IP network. The GMSC-L 114 is also connected via some voice trunking following industry norm.

The foreign resident country mobile operator 122 consists of mobile network elements SMSC-F 128, HLR-F 134, GGSN-F 132, GMSC-F 126, VLR/VMSC-F 130, which are connected via a signal transfer point STP-F 124 using SS7. The GMSC-F 126 is also connected via some voice trunking following industry norm. The two network operators 102 and 122 are connected via SS7 and GRX.

The native country mobile operator 102 is the operator offering a local mobile number (with an associated local IMSI) service to the foreign resident mobile 106. It hosts the signal gateway 108 and does special processing for foreign resident independently of the foreign resident mobile operator 122. The SG 108 will function as a virtual HLR to the local mobile number to receive queries on call and SMS on the local number. It also performs many other functions like a SMSC, VMSC, SGSN, GGSN, VLR, etc. The foreign resident country mobile operator 122 is the operator providing the SIM/device 106 (with a resident mobile number and its associated IMSI) to the resident. The foreign resident mobile 106 can receive calls and SMS on either the native country local mobile number or the resident country mobile number. When the foreign resident mobile 106 visits the native country, it can register with the native country mobile operator 102 with a local identity (local mobile number and its associated IMSI) and a local rate billing with just the SIM/device of the foreign resident country mobile operator 122.

Figure 2:
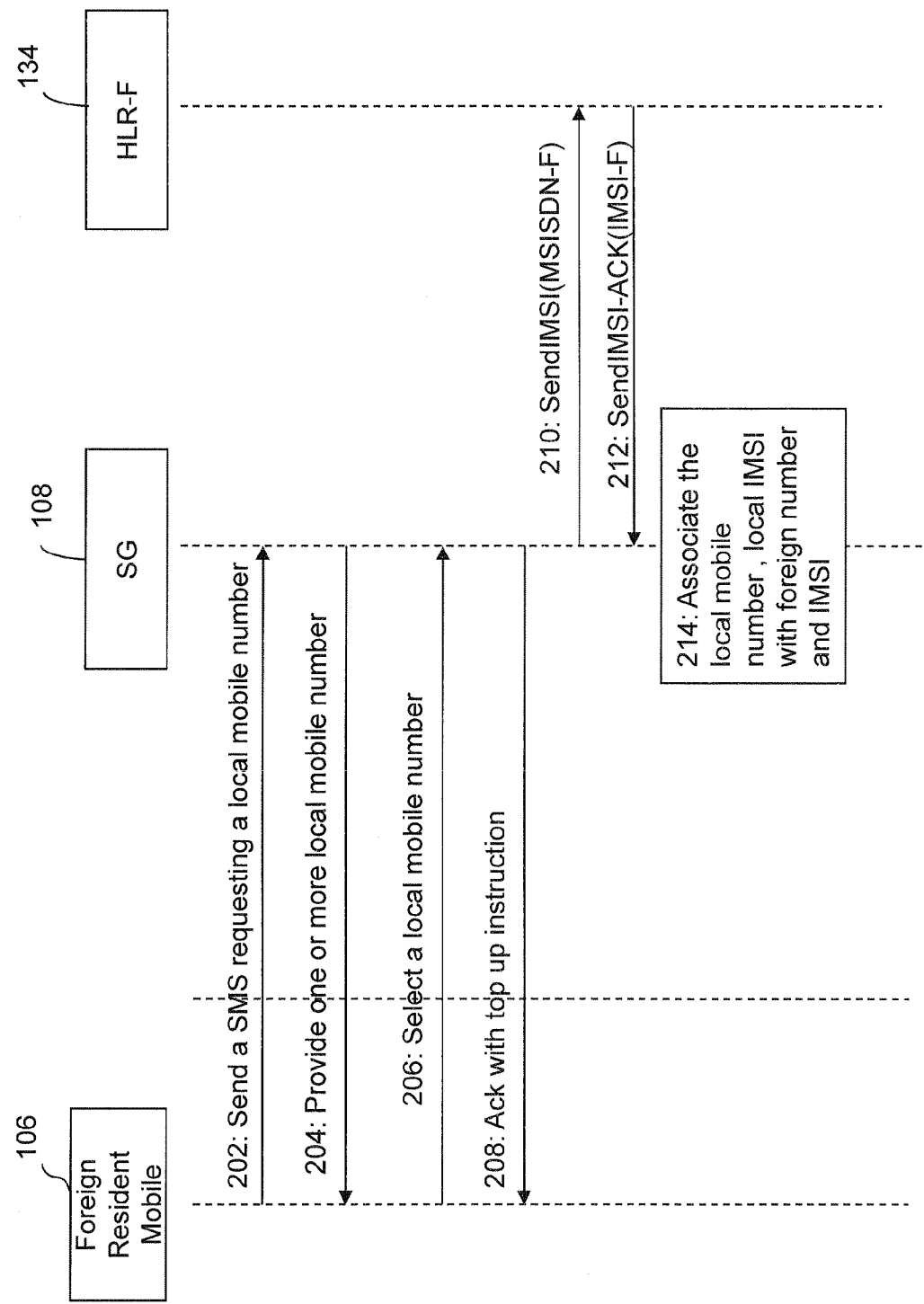
FIG. 2 represents a flow diagram for registering a foreign IMSI with a local mobile number for the foreign resident, in accordance with an aspect of the invention.

FIG. 2 describes a mobile subscription process of a foreign resident mobile 106 to obtain a local mobile number of the native country mobile operator 102. In this case, the foreign resident mobile simply sends a subscription text message to the SG 108 (which can be presented as an international number by the operator 102). SG will provide one or a list of local numbers to the foreign resident mobile 106 to select. Once selected and acknowledged perhaps with top up instructions for prepaid account, the SG 108 establishes a mapping between (the local number MSISDN-L, its associated IMSI-L) and (the foreign number MSISDN-F, its associated IMSI-F). SG 108 might also query HLR-F 134 (e.g., via SendIMSI) to obtain IMSI-F.

There can also be other means of subscription, e.g. via web or USSD. Top up process for prepaid account of a local mobile number is omitted here. One method can be via a web interface using credit/debit card. Others can be via mobile (in which case the SG 108 will proxy the top up process by converting IMSI-F/MSISDN-F to IMSI-L/MSISDN-L to the PPS 110). Postpaid account is also possible by setting up a credit/debit card direct debit process.

Figure 3:
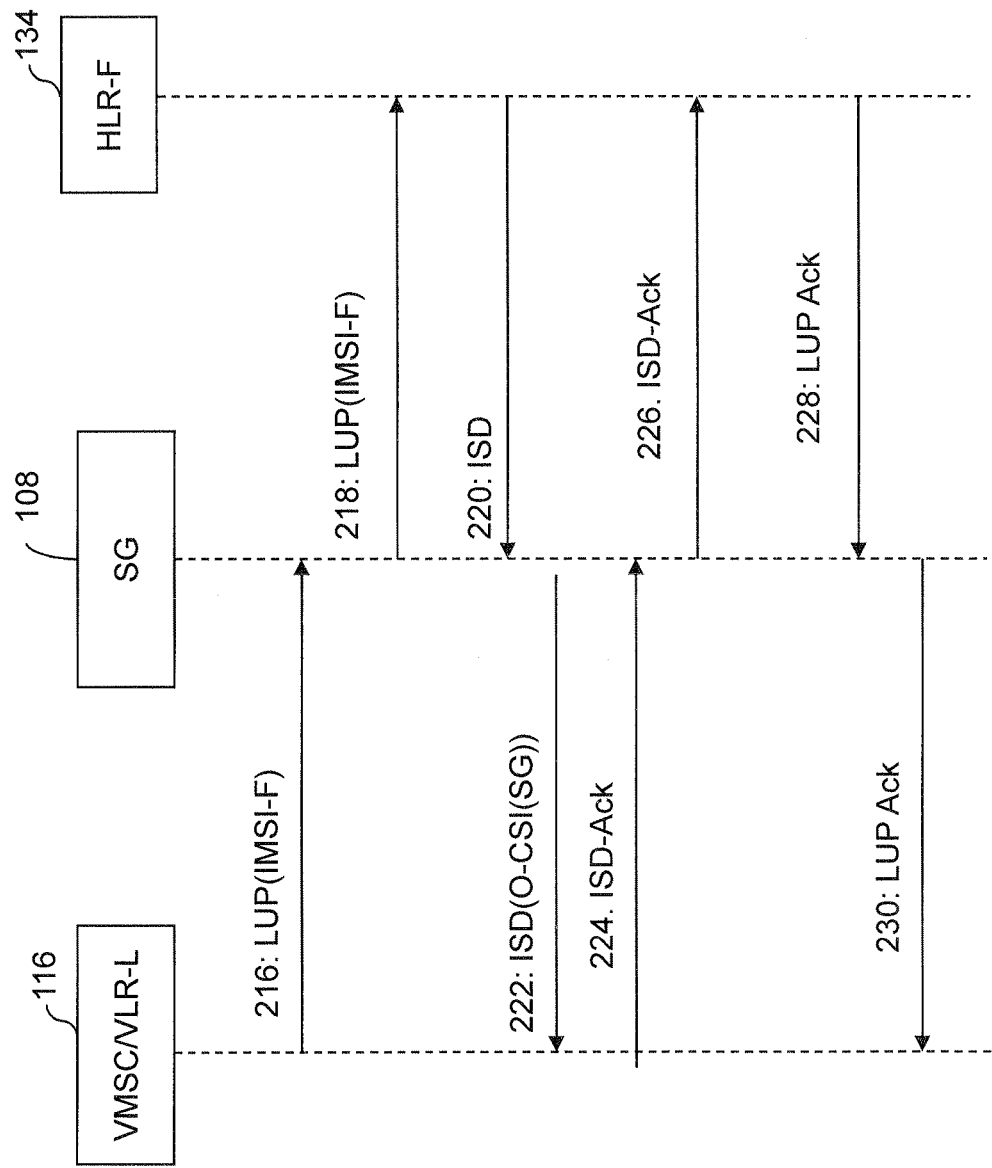
FIG. 3 represents a flow diagram in accordance with aspects of the present invention.

FIG. 3 describes the registration process by the foreign resident mobile 106 at the native country mobile operator 102 when the foreign resident is visiting the native country. The mobile 106's location Update on IMSI-F at VLR/VMSC-L 116 is routed thru SG 108. SG 108 proxies the Location Update to the HLR-F 134 of the foreign resident mobile operator 122. When profile data in InsertSubscriberData from HLR-F 134 is returned via SG 108, SG 108 adds/modifies O-CSI data with SCP set to SG and records the profile at the SG 108.

Similar process follows for GPRS location update except at SGSN-L 104 with GPRS LUP instead of VLR-L 116.

Figure 4:
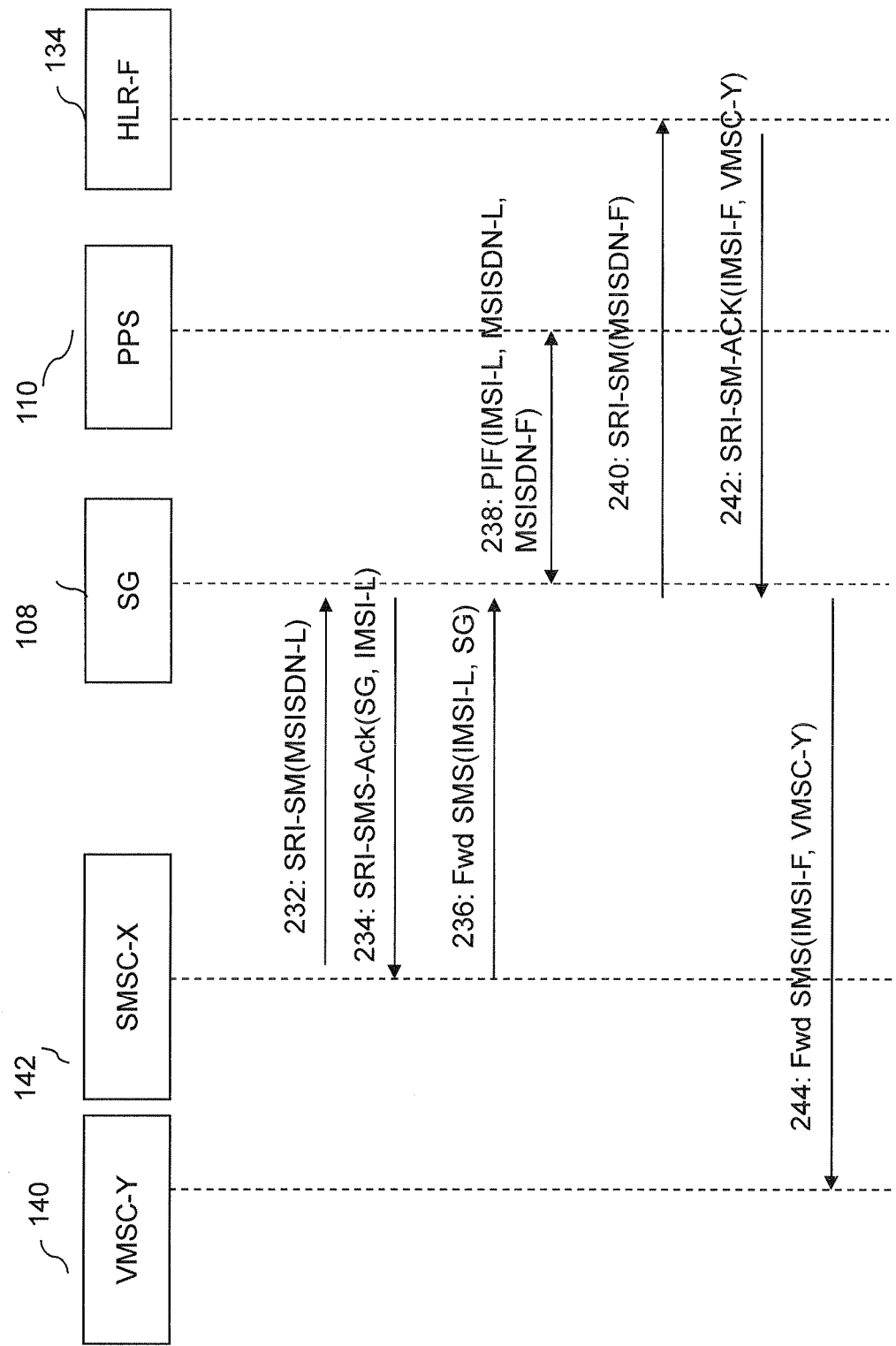
FIG. 4 represents a flow diagram of MT SMS to the local mobile number of the foreign resident when the resident is not registered at the native country mobile operator, in accordance with an aspect of the invention.

FIG. 4 describes the flow of MT SMS to the local mobile number MSISDN-L when the foreign resident mobile 106 is not registered (e.g. not at the native country at all) with the native country mobile operator 102. The MT SMS can be sent by any SMSC-X 142. The query to the location of MSISDN-L is sent to the SG 108, which responds with SG as the location and IMSI-L as the IMSI. The MT SMS is then forwarded to SG. SG 108 will then find out the location of MSISDN-F and relays the MT SMS to the real location VMSC-Y 140. The step 238 is performed by SG 108 to interface PPS 110 in case of a prepaid account set up on the local mobile number by the foreign resident mobile 106 as if the MT SMS is sent by the local mobile number MSISDN-L to MSISDN-F. The charge deducted would be the rate similar to an international SMS sent by a local mobile of the native country mobile operator to an international mobile number of the foreign resident mobile operator.

The prepaid interface detail will not be specified in this document, as there can be numerous ways of implementing it. One way is thru Camel Proxy if PPS is camel based. Another way can just be a proprietary IP interface.

Figure 5:
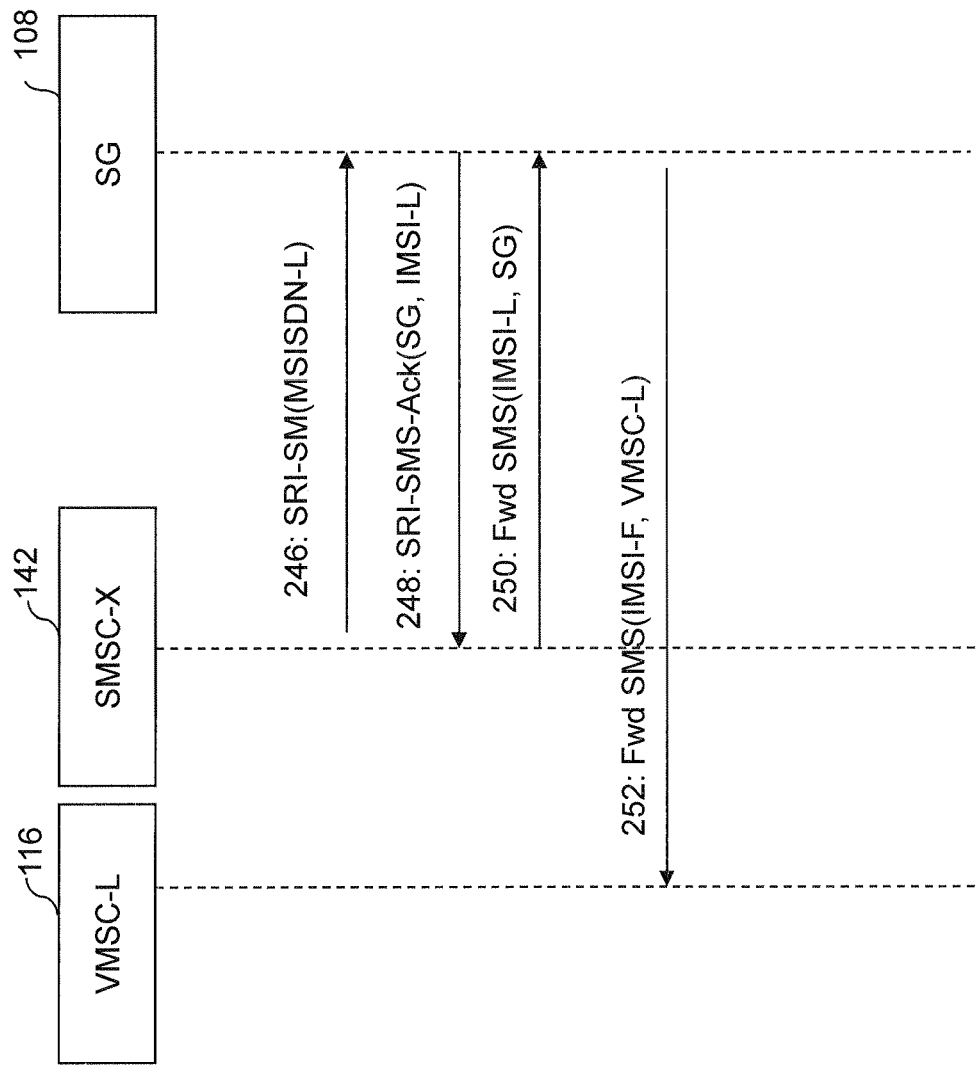
FIG. 5 represents a flow diagram of MT SMS to the local mobile number of the foreign resident when the resident is registered at the native country mobile operator, in accordance with an aspect of the invention.

FIG. 5 describes the flow of MT SMS to the local mobile number MSISDN-L when the foreign resident mobile 106 is registered (e.g. visiting/roaming at the native country) with the native country mobile operator 102. The MT SMS can be sent by any SMSC-X 142. The query to the location of MSISDN-L is sent to the SG 108, which responds with SG as the location and IMSI-L as the IMSI. The MT SMS is then forwarded to SG. Since SG 108 knows the foreign resident mobile is currently at VMSC-L 116 (during the registration process described in FIG. 3), SG 108 will forward the MT SMS to VMSC-L 116. Local and roaming MT SMS are normally free, hence no PPS interface is required.

Note that unless specifically specified, flows of other situations will follow industry norm and standard. For example, MT-SMS to the MSISDN-F when the foreign resident mobile 106 is not registered at the native country mobile operator 102 will follow normal MT-SMS procedure.

Figure 6:
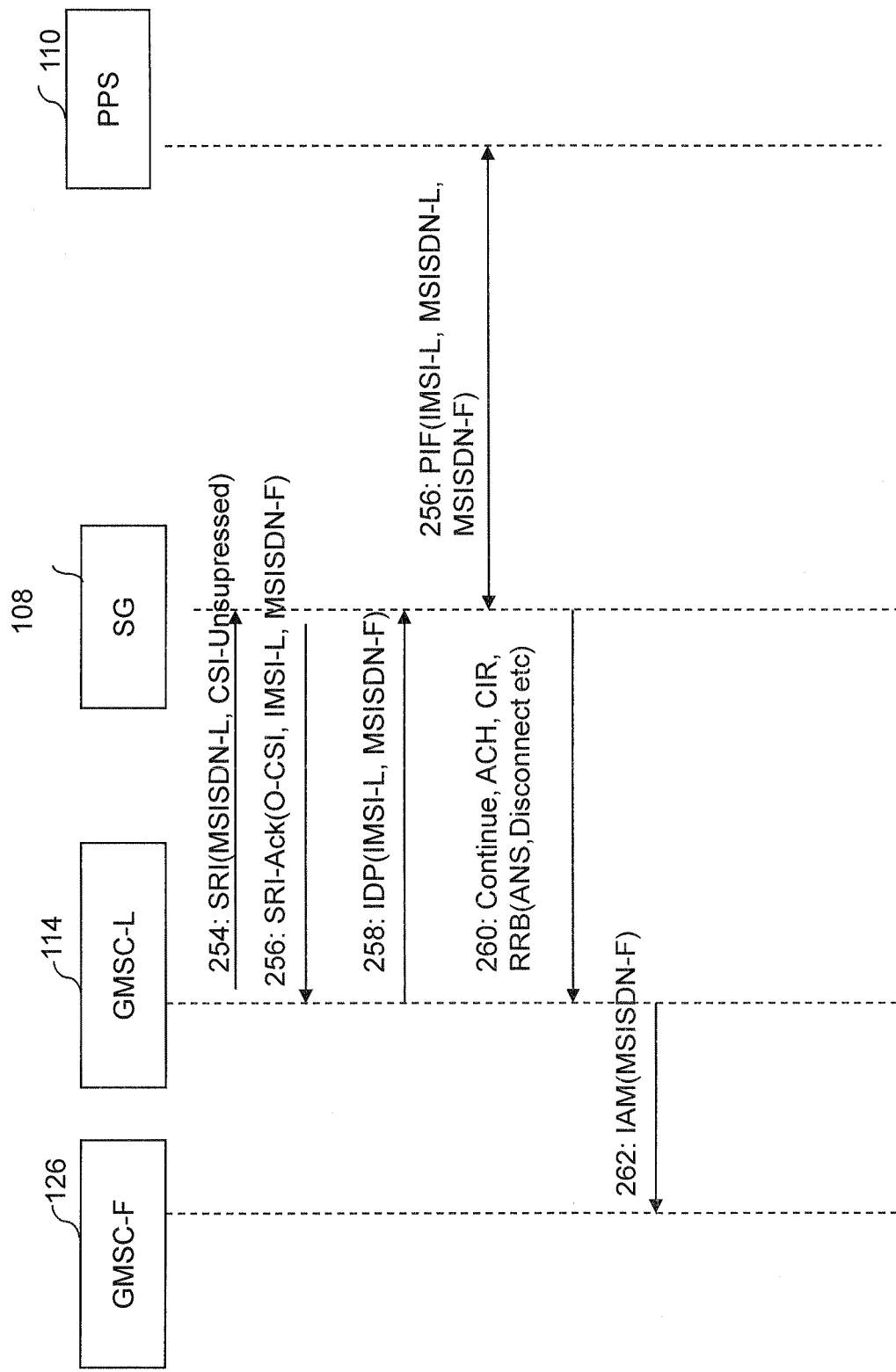
FIG. 6 represents a flow diagram of MT call to the local mobile number of the foreign resident when the resident is not registered at the native country mobile operator, in accordance with an aspect of the invention.

FIG. 6 describes the flow of MT call to the local mobile number MSISDN-L when the foreign resident mobile 106 is not registered (e.g. not at the native country at all) with the native country mobile operator 102. The MT call will reach GMSC-L 114 no matter where the call is coming from. The query for the routing information of MSISDN-L by GMSC-L 114 is sent to the SG 108 with unsuppressed camel subscription information, which responds with an O-CSI and IMSI-L as the IMSI as well as the unconditional forwarding to MSISDN-F. The GMSC-L 114 then initiates a camel IDP interface with SG 108 using IMSI-L, redirecting number MSISDN-L and forward-to number MSISDN-F as parameters. The step 256 is performed by SG 108 to interface PPS 110 in case of a prepaid account set up on the local mobile number by the foreign resident mobile 106 as if the MT call is made by the local mobile number MSISDN-L to MSISDN-F. The charge deducted would be the rate similar to an international call made by a local mobile of the native country mobile operator to an international mobile number of the foreign resident mobile operator.

The SG 108 returns to GMSC-L 114 some CAP messages, which usually include Continue, ACM, RRB, and CIReq, among others. Some of the messages usually help generate CDR, control the call progress and interface PPS 110. The GMSC-L will then just forward to the call to MSISDN-F, which should eventually reach GMSC-F 126

Figure 7:
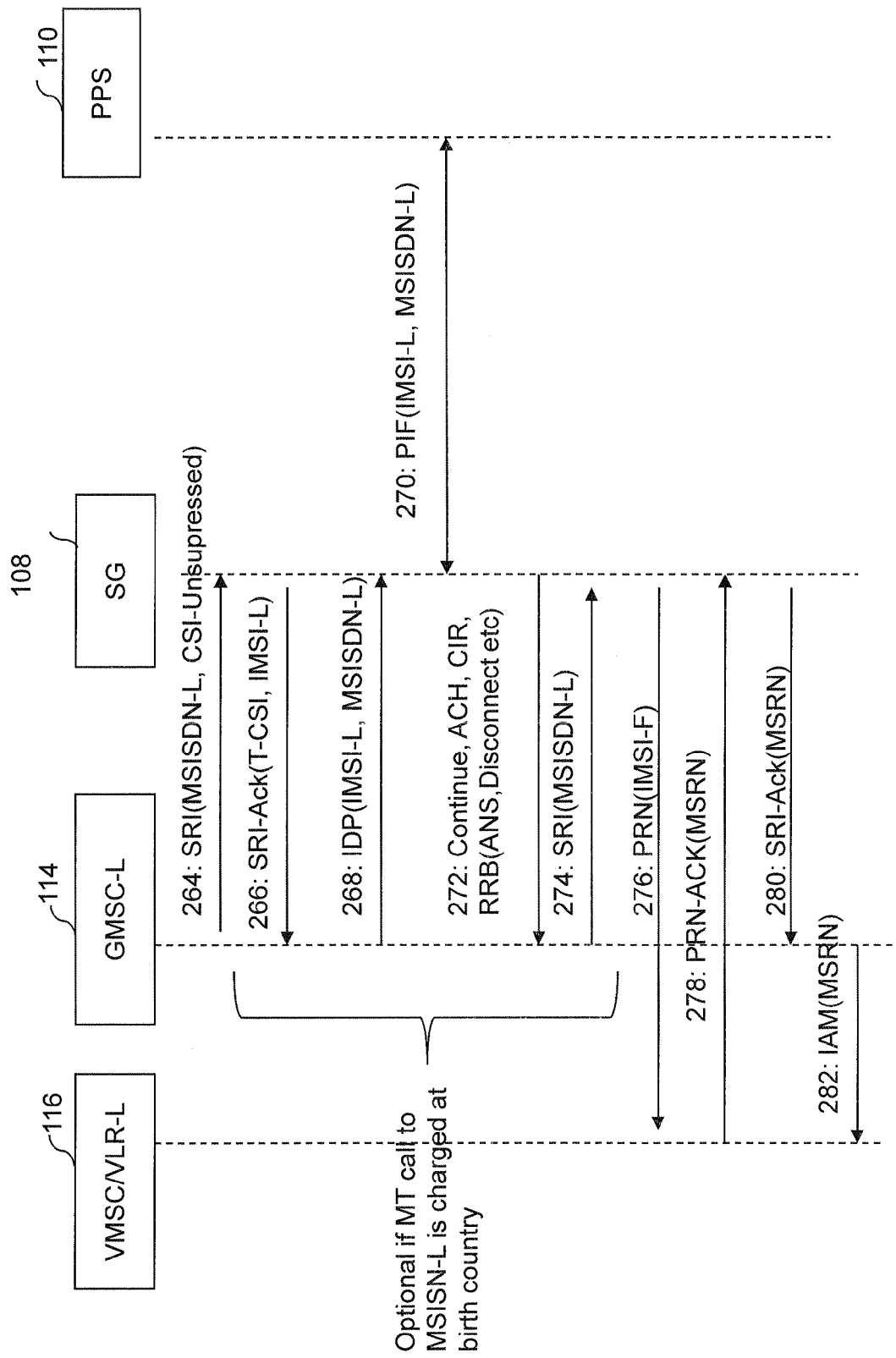
FIG. 7 represents a flow diagram of MT SMS to the local mobile number of the foreign resident when the resident is registered at the native country mobile operator, in accordance with an aspect of the invention.

FIG. 7 describes the flow of MT call to the local mobile number MSISDN-L when the foreign resident mobile 106 is registered (e.g. visiting or roaming at the native country) with the native country mobile operator 102. The MT call will reach GMSC-L 114 no matter where the call is coming from. The query for the routing information of MSISDN-L by GMSC-L 114 is sent to the SG 108 with unsuppressed camel subscription information, which responds optionally with a T-CSI and IMSI-L if the MT call is to be charged. If it is to be charged, the GMSC-L 114 then initiates a camel IDP interface with SG 108 using IMSI-L, called number MSISDN-L as parameters. The SG 108 returns to GMSC-L 114 some CAP messages, which usually includes Continue, ACH, RRB, CIReq, etc. Some of the messages usually help generate CDR, control the call progress and interface PPS 110.

The step 270 is performed by SG 108 to interface PPS 110 in case of a prepaid account set up on the local mobile number by the foreign resident mobile 106 as if the MT call is received by the local mobile number MSISDN-L. The charge deducted would be the rate similar to receive a call by a local mobile of the native country mobile operator.

The SG 108 will issue PRN(IMSI-F) to find the routing number from location of the roamer at the native country mobile operator 102. On receiving the routing number MSRN from SG 108, the GMSC-L 114 routes the call forward the routing number MSRN.

Again, note that unless specifically specified, flows of other situations will follow industry norm and standard. For example, MT-call to the MSISDN-F when the foreign resident mobile 106 is not registered at the native country mobile operator 102 will follow normal MT-call procedure.

Figure 8:
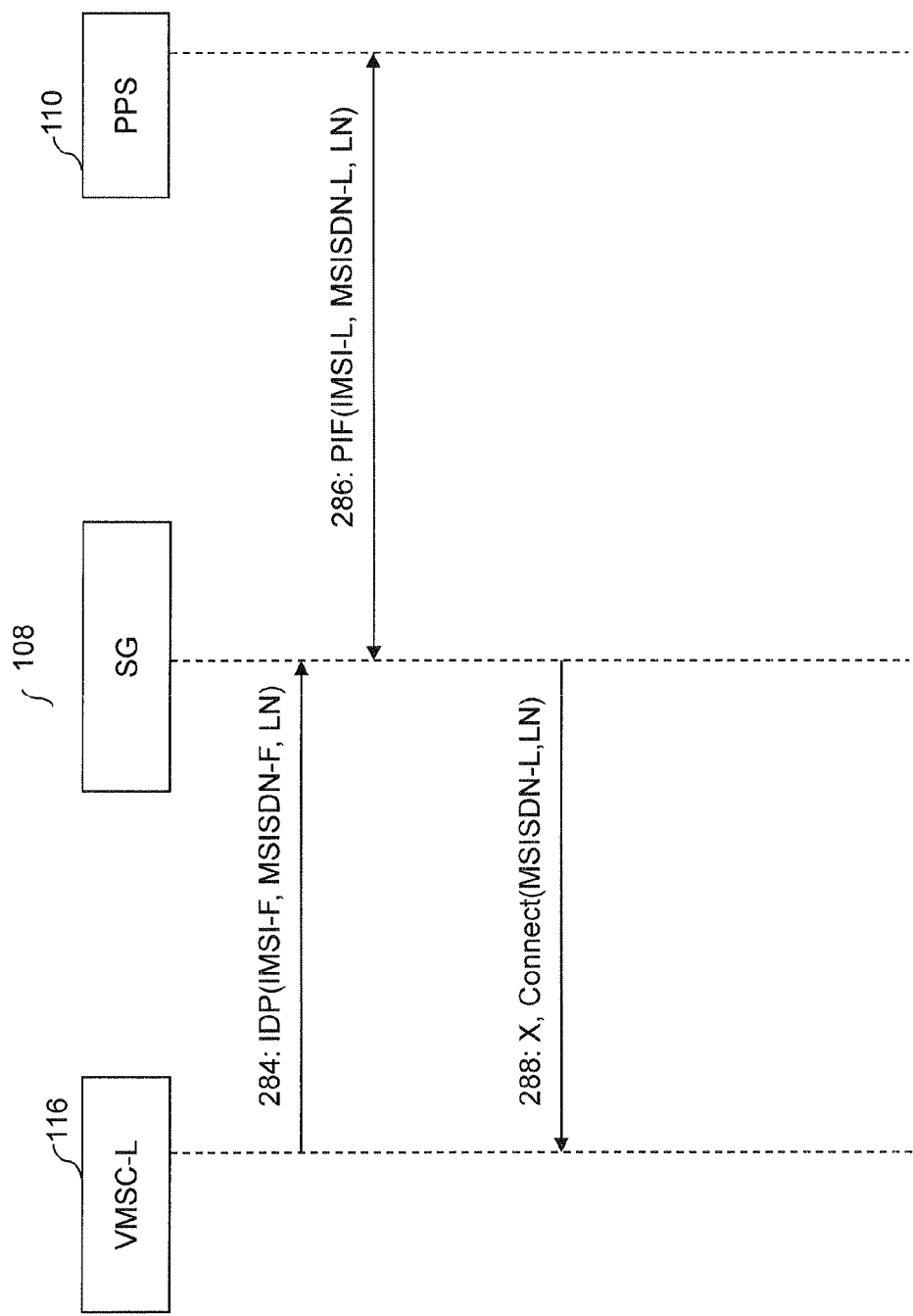
FIG. 8 represents a flow diagram of MO call to a native country number by the foreign resident when the resident is registered at the native country mobile operator, in accordance with an aspect of the invention.

FIG. 8 describes the flow of MO-call to a native country local number by the foreign resident mobile 106 registered at the native country mobile operator 102. Since, during the registration process described in FIG. 3 an O_CSI with SG 108 as the SCP is created at the VLR/VMSC-L 116, VMSC-L 116 will initiate CAP IDP to SG 108 with IMSI-F, MSIDN-F and the called local number as parameters.

Because the call is made to a local number, SG 108 responds to VMSC-L 116 with Connect (MSISDN-L as CLI) in addition to normal CAP messages as mentioned before. The Connect message essentially changes the CLI to MSISDN-L from MSISDN-F since the call is a local call by the foreign resident mobile registered at the native country mobile operator.

The step 286 is performed by SG 108 to interface PPS 110 in case of a prepaid account set up on the local mobile number MSISDN-L and its associated local IMSI-L by the foreign resident mobile 106 as if the MO call is made by the local mobile number MSISDN-L. The charge deducted would be the rate similar to a call made by a local mobile of the native country mobile operator to a local country number.

Figure 9:
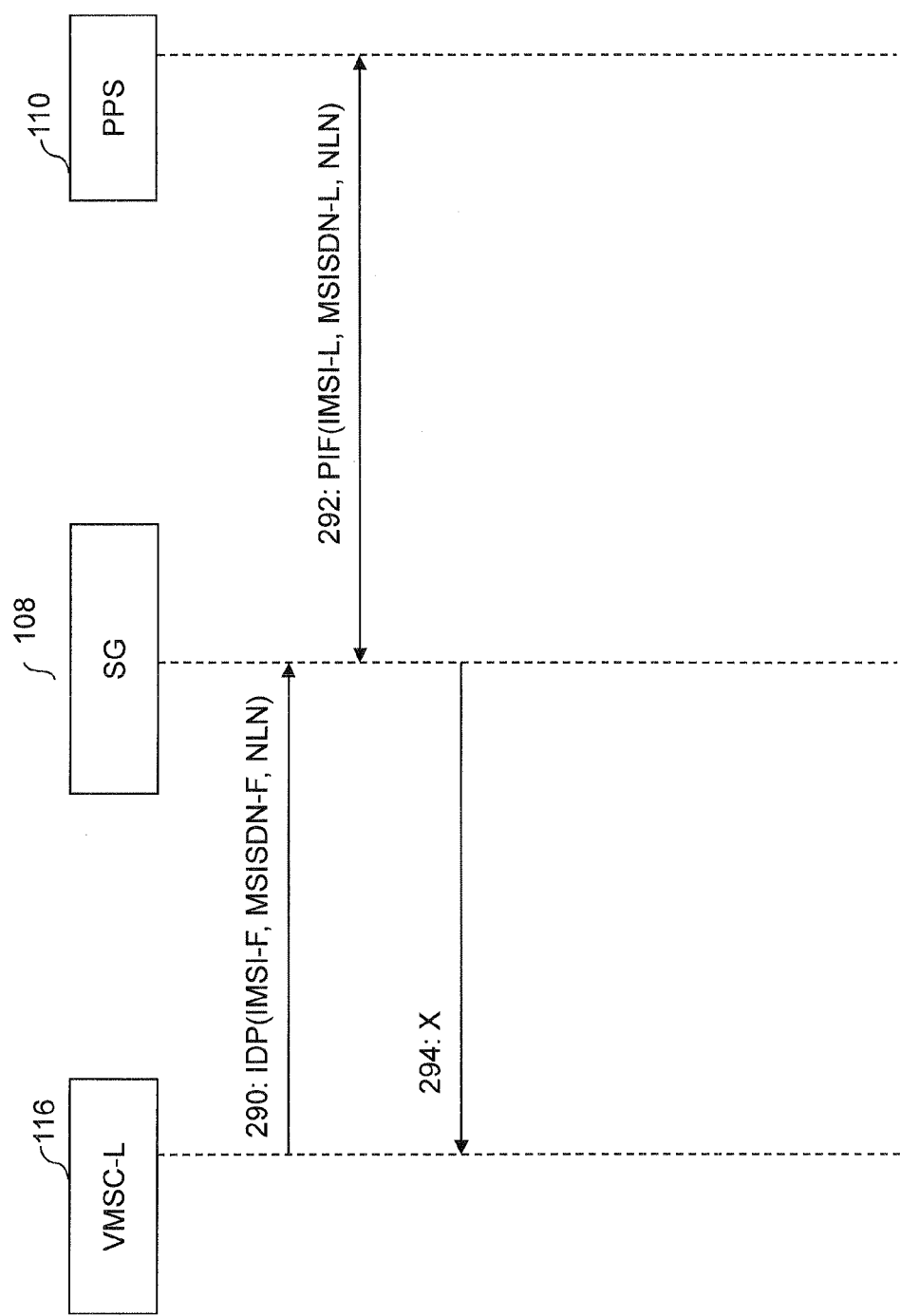
FIG. 9 represents a flow diagram of MO call to a non-native country number by the foreign resident when the resident is registered at the native country mobile operator, in accordance with an aspect of the invention.

FIG. 9 describes the flow of MO-call to a non-native country number by the foreign resident mobile 106 registered at the native country mobile operator 102. Since, during the registration process described in FIG. 3 an O_CSI with SG 108 as the SCP is created at the VLR/VMSC-L 116, VMSC-L 116 will initiate CAP IDP to SG 108 with IMSI-F, MSIDN-F and the called non-local number as parameters.

Because the call is made to a non-local number, SG 108 responds to VMSC-L 116 with normal CAP messages as mentioned before. There is no CLI change (i.e., remaining to be MSISDN-F) since the call is a non-local call by the foreign resident mobile registered at the native country mobile operator.

The step 292 however is still performed by SG 108 to interface PPS 110 in case of a prepaid account set up on the local mobile number MSISDN-L and its associated local IMSI-L by the foreign resident mobile 106 as if the MO call is made by the local mobile number MSISDN-L. The charge deducted would be the rate similar to a call made by a local mobile of the native country mobile operator to a non-local country number (i.e., international call).

Again, note that unless specifically specified, flows of other situations will follow industry norm and standard. For example, MO-call by the foreign resident mobile 106 not registered at the native country mobile operator 102 will follow normal MO-call procedure.

Figure 10:
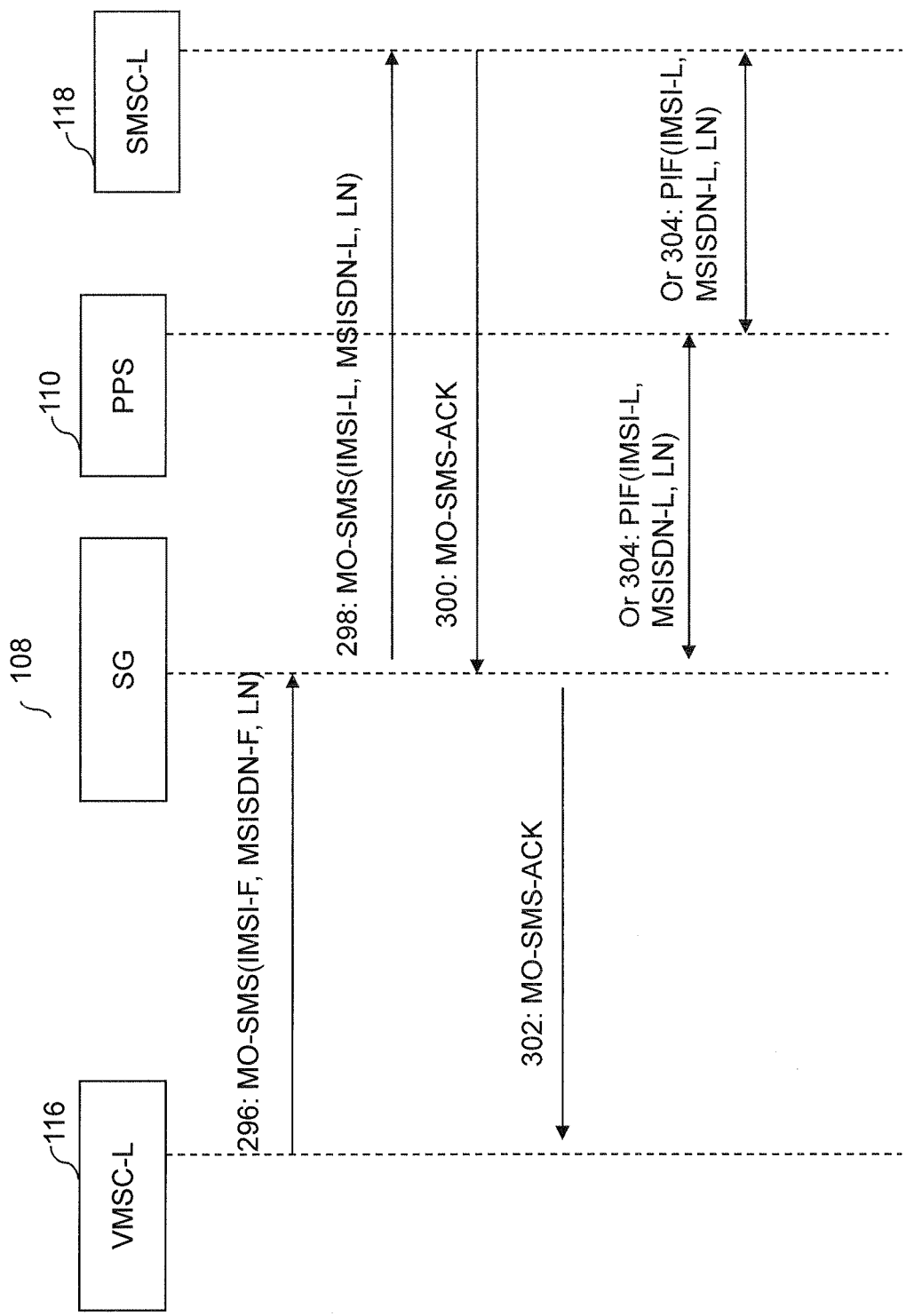
FIG. 10 represents a flow diagram of MO SMS to a native country number by the foreign resident when the resident is registered at the native country mobile operator, in accordance with an aspect of the invention.

FIG. 10 describes the flow of MO-SMS to a native country local number by the foreign resident mobile 106 registered at the native country mobile operator 102. In one aspect of invention, since, during the registration process described in FIG. 3 an O_CSI for SMS (assuming CAMEL 3 support by the operator 102) with SG 108 as the SCP is created at the VLR/VMSC-L 116, VMSC-L 116 will initiate CAP IDP-SMS to SG 108 with IMSI-F, MSIDN-F and the sent-to local number as parameters. In another aspect of invention, we do not assume CAMEL 3 support by the native operator 102. In this case, the MO-SMS by the foreign resident mobile 106 towards SMSC-F 128 will be redirected thru SG 108. FIG. 10 will use this case for illustration.

Because the SMS is sent to a local number and we want to change the CLI of the sender to MSISDN-L, SG 108 simply relays the MO-SMS message to the local SMSC-L 118 after changing the IMSI-F and MSISDN-F to IMSI-L and MSISDN-L respectively. The step 304 can be performed by either SG 108 or SMSC-L 118 to interface PPS 110 in case of a prepaid account set up on the local mobile number MSISDN-L and its associated local IMSI-L by the foreign resident mobile 106 as if the MO SMS is sent by the local mobile number MSISDN-L. The charge deducted would be the rate similar to a SMS sent by a local mobile of the native country mobile operator to a local country number.

The above flow can be equally applicable to a MO-SMS to non-native country number if we do not worry about the sender ID as MSISDN-L. However this can be confusing to recipients (e.g. of those from foreign resident country) who are used to know the sender's ID as MSISDN-F.

Figure 11:
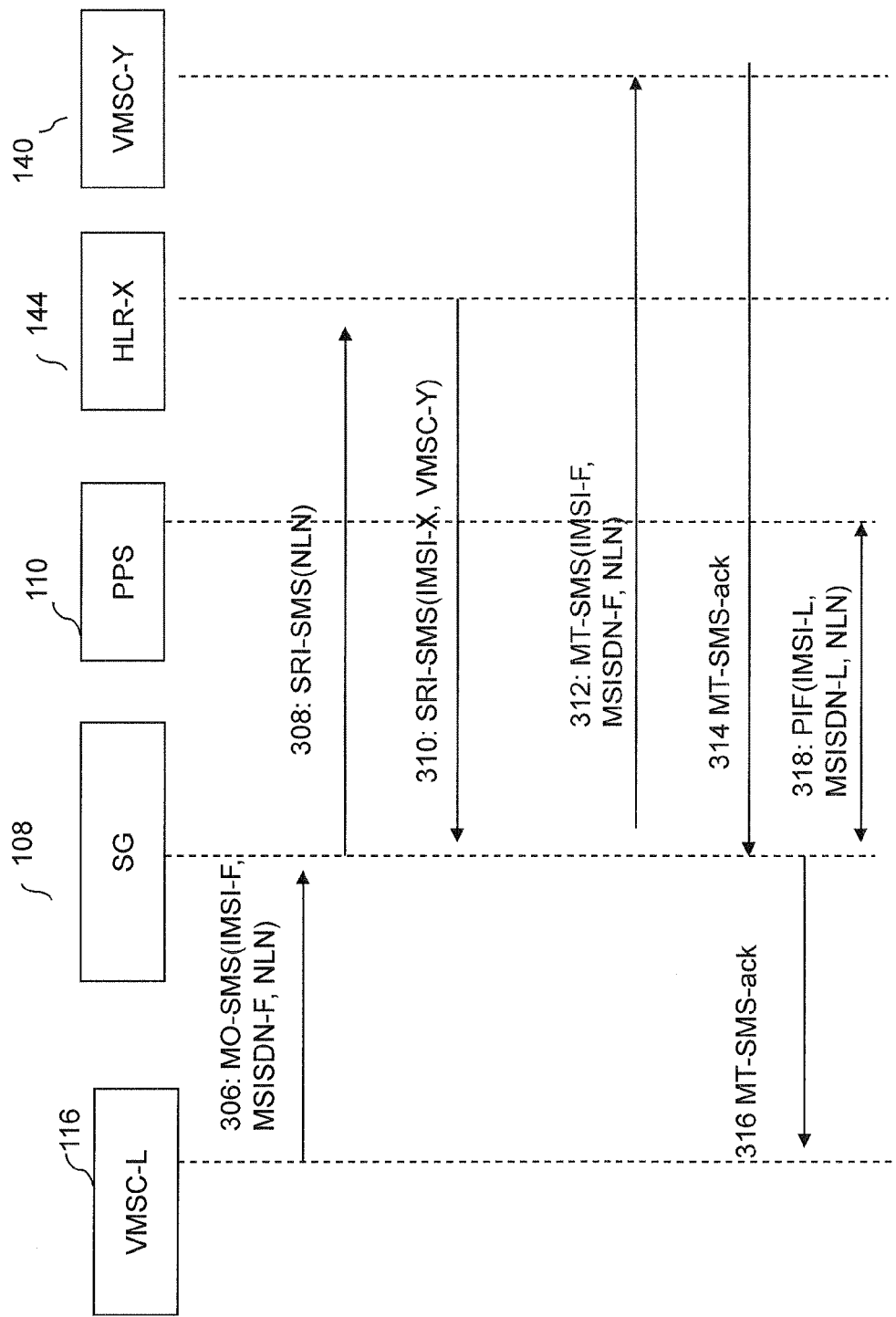
FIG. 11 represents a flow diagram of MO SMS to a non-native country number by the foreign resident when the resident is registered at the native country mobile operator, in accordance with an aspect of the invention.

FIG. 11 describes the flow of MO-SMS to a non-native country number by the foreign resident mobile 106 registered at the native country mobile operator 102 where we want to maintain the MSISDN-F as the sender ID. In one aspect of invention, since, during the registration process described in FIG. 3 an O_CSI for SMS (assuming CAMEL 3 support by the operator 102) with SG 108 as the SCP is created at the VLR/VMSC-L 116, VMSC-L 116 will initiate CAP IDP-SMS to SC 108 with IMSI-F, MSIDN-F and the sent-to non local number as parameters. In another aspect of invention, we do not assume CAMEL 3 support by the native operator 102. In this case, the MO-SMS by the foreign resident mobile 106 towards SMSC-F 128 will be redirected thru SG 108. FIG. 11 will use this case for illustration.

Because the SMS is sent to a non-local number and we want to maintain the CLI of the sender as MSISDN-F, SG 108 cannot simply relay the MO-SMS message to the local SMSC-L 118 as otherwise SMSC-L would have presented MSISDN-L as the sender. The SG 108 in this case will function like a virtual SMSC by finding out the location of the non-local number and forward the message on directly. The step 318 however is still performed by SG 108 to interface PPS 110 in case of a prepaid account set up on the local mobile number MSISDN-L and its associated local IMSI-L by the foreign resident mobile 106 as if the international MO SMS is sent by the local mobile number MSISDN-L. The charge deducted would be the rate similar to an international SMS sent by a local mobile of the native country mobile operator to a non-local country number (i.e. international number).

Again, note that unless specifically specified, flows of other situations will follow industry norm and standard. For example, MO-SMS by the foreign resident mobile 106 not registered at the native country mobile operator 102 will follow normal MO-SMS procedure.

It is worth mentioning that because MO-SMS is sometimes tied with home network, e.g. information service short code, there can be a toggle between local profile and home profile by the foreign resident mobile when registered at the native country mobile operator. The toggle procedure is not specified here. Some methods can be USSD, IVR or web to interface SG 108. SG 108 will remember the selected profile of the foreign resident mobile. If the selected profile is home profile, SG will bypass the MO-SMS message to the SMSC-F 128 without changing anything. In this case, billing will be controlled by the foreign resident country mobile operator 122.

Figure 12:
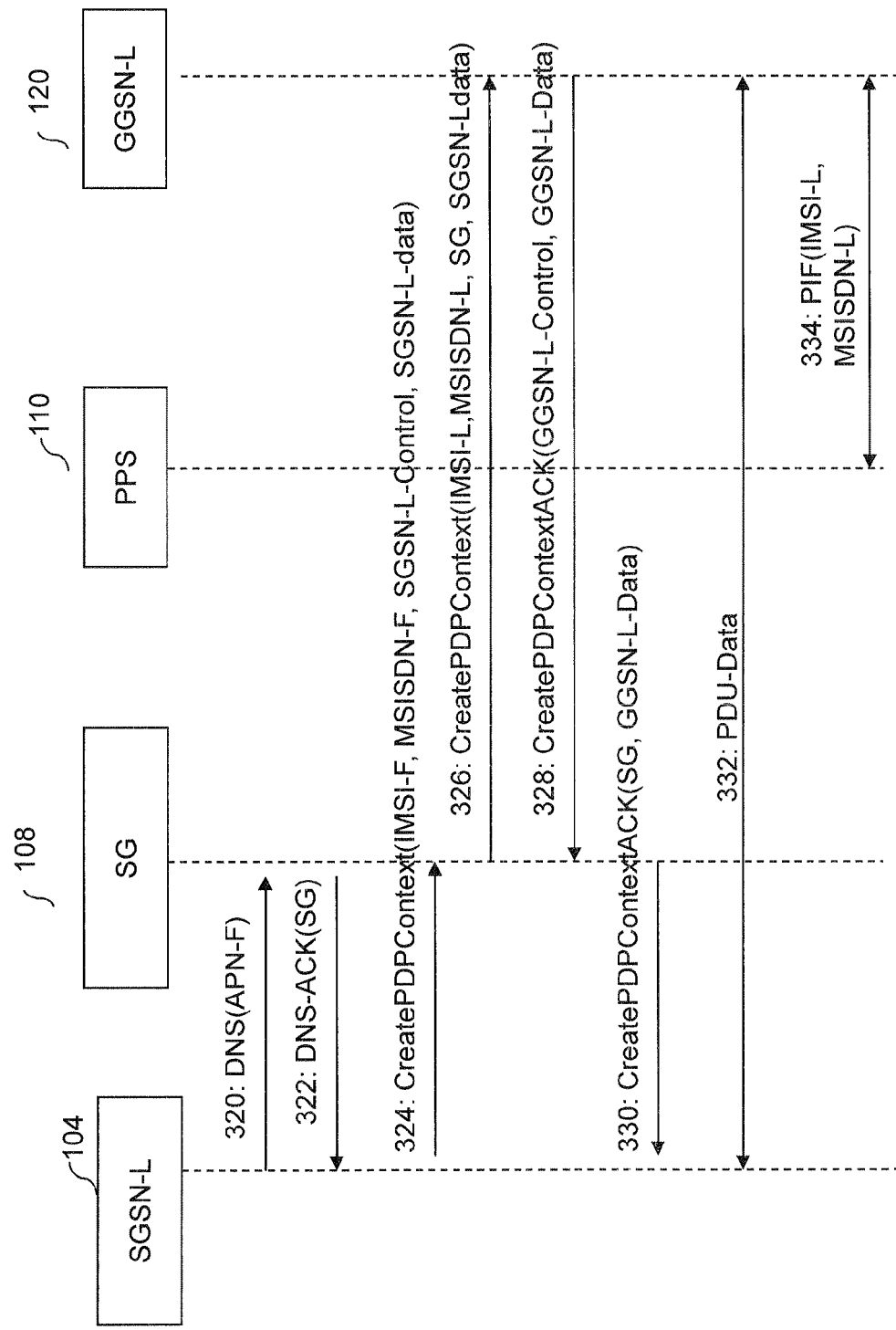
FIG. 12 represents a flow diagram of data access to the native country local data network by the foreign resident when the resident is registered at the native country mobile operator, in accordance with an aspect of the invention.

FIG. 12 describes the flow of local GPRS access by the foreign resident mobile 106 registered at the native country mobile operator 102. In one aspect of invention, since, during the GPRS registration process described in FIG. 3 an O_CSI for GPRS (assuming CAMEL 3 support by the operator 102) with SG 108 as the SCP is created at the SGSN-L 104, SGSN-L 104 will initiate CAP IDP-GPRS to SG 108 with IMSI-F, MSIDN-F, APN-F as parameters. In another aspect of invention, we do not assume CAMEL 3 support by the native operator 102. In this case, the local GPRS access by the foreign resident mobile 106 towards GGSN-L 120 will be redirected thru SG 108. FIG. 12 will use this case for illustration.

The redirection is achieved by having DNS query from SGSN-L 102 on APN.F answered by SG 108, which returns to SGSN-L 102 its own GT as the GGSN. SGSN-L 102 will then create PDP context thru SG 108 as a proxy. SG 108 will proxy the GPRS control messages at control address level between SGSN-L 102 and GGSN-L 120, as it needs to change IMSI-F and MSISDN-F to IMSI-L and MSISDN-L while maintaining the data end points at both address identifiers and tunnel identifiers. SG 108 will not be involved for the data tunnel between SGSN-L 102 and GGSN-L 120, which will directly communicate each other on data PDU.

The step 334 can be performed by either SG 108 or GGSN-L 120 to interface PPS 110 in case of a prepaid account set up on the local mobile number MSISDN-L and its associated local IMSI-L by the foreign resident mobile 106 as if the GPRS access is made by the local mobile number MSISDN-L. The charge deducted would be the rate similar to a local data access by a local mobile of the native country mobile operator.

Again, note that unless specifically specified, flows of other situations will follow industry norm and standard. For example, GPRS access by the foreign resident mobile 106 not registered at the native country mobile operator 102 will follow normal GPRS procedure.

It is also worth mentioning that because data service is sometimes tied with home network, e.g. enterprise blackberry and MMS service, there can be a toggle between local profile and home profile by the foreign resident mobile when registered at the native country mobile operator. The toggle procedure is not specified here. Some methods can be USSD, IVR or web to interface SG 108. SG 108 will remember the selected profile of the foreign resident mobile. If the selected profile is home profile, SG will bypass the CreatePDPContext message to the GGSN-F 132 without changing anything. In this case, billing will be controlled by the foreign resident country mobile operator 122.

Although we discussed about prepaid deduction for prepaid account set up of the foreign resident mobile, we have not touched about how to filter out the roaming CDR of the foreign resident mobile registered at the native country mobile operator 102 to avoid TAP out on the foreign IMSI-F/device/SIM 106 to the foreign resident country mobile operator 122. There can be many ways of doing it.

One option is to simply filter the TAP out thru SG 108's CDR so that for any foreign resident IMSI that has a selected local profile, their TAP records will be dropped.

Another option is to use FCI/FCI-SMS/FCI-GPRS CAP/IN method in interfacing with VMSC-L 116 and SGSN-L 104

Although we have focused the description of the invention in the context of GSM, it will be apparent to a person skilled in the art, that the LMFM services can also be applied to CDMA/ANSI-41D, and other technologies such as, but may not be limited to, VoIP, WiFi, Wimax, 2G, 3G, LTE, and inter-standard roaming.

The present invention can take the form of an entirely hardware variation, an entirely software variation, or a variation containing both hardware and software elements. In accordance with an aspect of the present invention, software, including but not limited to, firmware, resident software, and microcode, implements the invention.

Furthermore, the invention can take the form of a computer program product, accessible from a computer-usable or computer-readable medium providing program code for use by, or in connection with, a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk-read only memory (CDROM), compact disk-read/write (CD-R/W) and Digital Versatile Disk (DVD).

In describing certain aspects of the MIMM system under the present invention, this specification follows the path of a telecommunications call, from a calling party to a called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

In the foregoing specification, specific aspects of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

APPENDIX

| Acronym | Description |
| --- | --- |
| 3G | Third generation of mobile |
| ACH | Apply Charging Handling |
| BSC | Base Station Controller |
| BCSM | Basic Call State Model |
| CAMEL | Customized Application for Mobile Enhanced Logic |
| CDMA | Code Division Multiplexed Access |
| CLI | Calling Line Identification |
| CIReq | Call Information Request |
| CdPA | Called Party Address |
| CAP | Camel Application Part |
| CC | Country Code |
| CB | Call Barring |
| CSI | Camel Subscription Information |
| DPC | Destination Point Code |
| DNS | Domain Name System |

APPENDIX-continued

| Acronym | Description |
| --- | --- |
| ERB | Event Report Basic Call State Model |
| GMSC | Gateway MSC |
| GPRS | General Packet Radio System |
| GLR | Gateway Location Register |
| GSM | Global System for Mobile |
| GSM SSF | GSM Service Switching Function |
| GT | Global Title |
| HLR | Home Location Register |
| HPMN | Home Public Mobile Network |
| IMSI | International Mobile Subscriber Identity |
| ID | Identifier |
| IN | Intelligent Network |
| ISG | International Signal Gateway |
| INAP | Intelligent Network Application Part |
| ISD | MAP Insert Subscriber Data |
| IAM | Initial Address Message |
| IDP | Initial DP IN/CAP message |
| ITR | Inbound Traffic Redirection |
| ISUP | ISDN User Part |
| KYC | Know Your Customer |
| LU | Location Update |
| LUP | MAP Location Update |
| LN | Local Country Number |
| MAP | Mobile Application Part |
| MCC | Mobile Country Code |
| MCC | Mobile Country Code |
| ME | Mobile Equipment |
| MNC | Mobile Network Code |
| MO | Mobile Originated |
| MSC | Mobile Switching Center |
| MSISDN | Mobile Subscriber ISDN Number |
| MSRN | Mobile Subscriber Roaming Number |
| MT | Mobile Terminated |
| MTP | Message Transfer Part |
| NLN | Non-Local Number |
| NPI | Numbering Plan Indicator |
| NDC | National Dialing Code |
| ODB | Operator Determined Barring |
| OTA | Over The Air |
| O-CSI | Originating CAMEL Subscription Information |
| PPS | PrePaid System |
| PRN | Provide Roaming Number |
| RNA | Roaming Not Allowed |
| RPD | Roamer Probe Database |
| RRB | Request Basic Call State Mobile |
| RI | Routing Indicator |
| SPC | Signal Point Code |
| SRI | Send Routing Information |
| SCCP | Signal Connection Control part |
| STP | Signal Transfer Point |
| SRI-SM | Send Routing Information For Short Message |
| SSP | Service Switch Point |
| SSN | Sub System Number |
| SIM | Subscriber Identify Module |
| STK | SIM Tool Kit Application |
| SM-RP-UI | Short Message Relay Protocol User Information |
| STP | Signal Transfer Point |
| SS | Supplementary Services |
| TR | Traffic Redirection |
| T-CSI | Terminating CAMEL Service Information |
| TCAP | Transaction Capabilities Application Part |
| TP | SMS Transport Protocol |
| UDHI | User Data Header Indicator |
| UDH | User Data Header |
| UD | User Data |
| VAS | Value Added Service |
| VoIP | Voice over Internet Protocol |
| VLR | Visited Location Register |
| VMSC | Visited Mobile Switching Center |
| WSP | Wireless Session Protocol |

The invention claimed is:

1. A system for mobile communications for providing a local Mobile Subscriber Integrated Services Digital Network Number (MSISDN) by a native country mobile operator to a foreign resident with a foreign mobile device having a single International Mobile Subscriber Identity (IMSI) Subscriber Identity Module (SIM) of a foreign mobile operator at the foreign resident's country, the system comprising:
a signaling gateway (SG) at the native country mobile operator for associating the local MSISDN and an associated local IMSI of the native country mobile operator with the foreign mobile device IMSI and an associated foreign MSISDN of the foreign mobile device using only the foreign mobile operator SIM;
wherein the SG facilitates the forwarding of text messages and calls to the local MSISDN to the associated foreign MSISDN no matter where the foreign mobile device SIM is registered;
wherein the SG enables the foreign mobile device to register with the native country mobile operator and perform mobile communication service as if the foreign mobile device is a local mobile device with the local MSISDN and the associated local IMSI, when the foreign resident is visiting the native country and registered with the native country mobile operator with the foreign mobile device;
wherein the SG supports selecting one of a local profile and home profile by the foreign mobile device when registered at the native country mobile operator; and
wherein there is no special relationship between the native country mobile operator and the foreign mobile operator.

2. The system of claim 1, wherein the local MSISDN is a prepaid account.

3. The system of claim 1, wherein the local MSISDN is a postpaid account.

4. The system of claim 1, wherein the enabled mobile communication service is one selected from a group consisting of Mobile Originated Short Message Service (MO-SMS), Mobile Terminated SMS (MT-SMS), Mobile Originated Call (MO-call), and Mobile Terminated Call and Data (MT call and data).

5. The system of claim 4, wherein the enabled mobile communication service is MO-SMS, and wherein the MO-SMS by the foreign resident mobile registered at the native country mobile operator to a native country number uses the local mobile number as a sender Identifier (ID).

6. The system of claim 4, wherein the enabled mobile communication service is MO-SMS, and wherein the MO-SMS by the foreign resident mobile registered at the native country mobile operator to a non native country number uses the foreign mobile number as a sender ID.

7. The system of claim 4, wherein the enabled mobile communication service is MO-call, and wherein the MO-call by the foreign resident mobile registered at the native country mobile operator to a native country number uses the local mobile number as a caller ID.

8. The system of claim 4, wherein the enabled mobile communication service is MO-call, and wherein the MO-call by the foreign resident mobile registered at the native country mobile operator to a non native country number uses the foreign mobile number as a caller ID.

9. The system of claim 1, wherein one of the native country mobile operator and the foreign mobile operator is a network selected from a group consisting of a Global System for Mobile (GSM), Code Division Multiplexed Access (CDMA), Third Generation GSM (3GSM), Voice over Internet Protocol (VoIP), Wireless Fidelity Worldwide Interoperability for Microwave Access (WiMax), Long Term Evolution (LTE), and American National Standards Institute-41 (ANSI-41) network.

10. A method for mobile communication for providing a local Mobile Subscriber Integrated Services Digital Network Number (MSISDN) by a native country mobile operator to a foreign resident with a foreign mobile device having a single International Mobile Subscriber Identity (IMSI) Subscriber Identity Module (SIM) of a foreign mobile operator at the foreign resident's country, the method comprising:

associating the local MSISDN and an associated local IMSI of the native country mobile operator, at a signaling gateway (SG) at the native country mobile operator, with the foreign mobile device IMSI and an associated foreign MSISDN of the foreign mobile device using only the foreign mobile operator SIM;

facilitating the forwarding of text messages and calls to the local MSISDN to the associated foreign MSISDN no matter where the foreign mobile device SIM is registered;

enabling the foreign mobile device to register with the native country mobile operator and perform mobile communication service as if the foreign mobile device is a local mobile device with the local MSISDN and the associated local IMSI, when the foreign resident is visiting the native country with the foreign device; and supporting a selection of one of a local profile and home profile by the foreign mobile device when registered at the native country mobile operator with the foreign mobile device;

wherein there is no special relationship between the native country mobile operator and the foreign mobile operator.

11. The method of claim 10, wherein the local MSISDN is a prepaid account.

12. The method of claim 10, wherein the local MSISDN is a postpaid account.

13. The method of claim 10, wherein the enabled mobile communication service is one of Mobile Originated (MO) Short Message Service (SMS) (MO-SMS), Mobile Terminated (MT) SMS (MT-SMS), MO-call, and MT call and data.

14. The method of claim 13, wherein the enabled mobile communication service is MO-SMS and wherein the MO-SMS by the foreign resident mobile registered at the native country mobile operator to a native country number uses the local mobile number as a sender Identifier (ID).

15. The method of claim 13, wherein the enabled mobile communication service is MO-SMS and wherein the MO-SMS by the foreign resident mobile registered at the native country mobile operator to a non native country number uses the foreign mobile number as a sender ID.

16. The method of claim 13, wherein the enabled mobile communication service is MO-call and wherein the MO-call by the foreign resident mobile registered at the native country mobile operator to a native country number uses the local mobile number as a caller ID.

17. The method of claim 13, wherein the enabled mobile communication service is MO-call and wherein the MO-call by the foreign resident mobile registered at the native country mobile operator to a non native country number uses the foreign mobile number as a caller ID.

18. The method of claim 10, wherein one of the native country mobile operator and the foreign mobile operator is a network selected from a group consisting of a Global System for Mobile (GSM), Code Division Multiplexed Access (CDMA), Third Generation GSM (3GSM), Voice over Internet Protocol (VoIP), Wireless Fidelity (Wi-Fi), Worldwide Interoperability for Microwave Access (WiMax), Long Term Evolution (LTE), and American National Standards Institute-41 (ANSI-41).

* * * * *